(No Model.)
G. C. TWYMAN.
ROLLER BEARING.
No. 564,127.  Patented July 14, 1896.
Fig. 1.
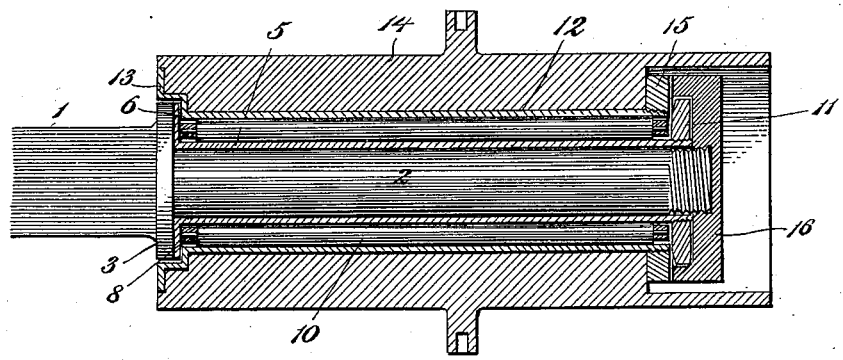
Fig. 2.
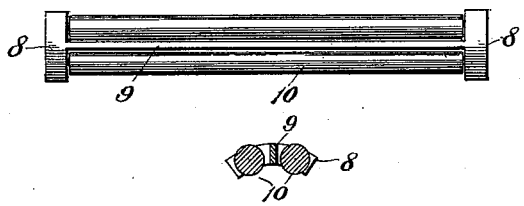
Fig. 3.
Fig. 4.
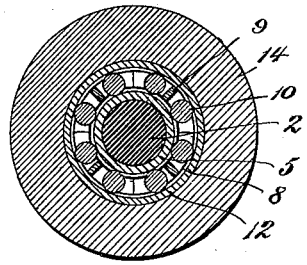
Fig. 5.
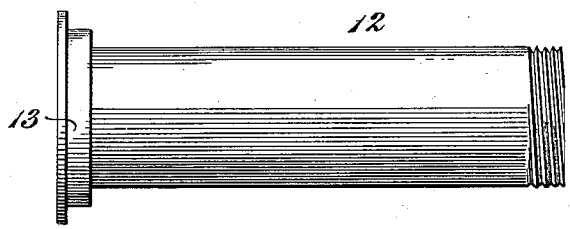
Fig. 6.
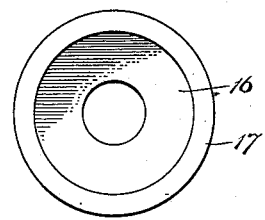
Witnesses
T. J. Keating
W. J. S. Duvall
Inventor
Goodloe C. Twyman.
By W. J. Duvall, Attorney.

UNITED STATES PATENT OFFICE.

GOODLOE C. TWYMAN, OF BOWLING GREEN, KENTUCKY.

ROLLER-BEARING.

SPECIFICATION forming part of Letters Patent No. 564,127, dated July 14, 1896.

Application filed October 4, 1895. Serial No. 564,633. (No model.)

*To all whom it may concern:*

Be it known that I, GOODLOE C. TWYMAN, a citizen of the United States, residing at Bowling Green, in the county of Warren and State of Kentucky, have invented certain new and useful Improvements in Roller-Bearings; and I do hereby declare the following to be a full, clear, and exact description of the invention, such as will enable others skilled in the art to which it appertains to make and use the same.

My invention relates to improvements in roller-bearings; and the objects in view are to produce a cheap and simple construction of bearing of this type, the same being designed for ready application to the spindles of vehicles, machinery, railway-coaches, &c., whereby friction may be accordingly reduced.

Various other objects and advantages of the invention will hereinafter appear, and the novel features thereof will be particularly pointed out in the claims.

Referring to the drawings, Figure 1 is a vertical longitudinal sectional view of a roller-bearing constructed in accordance with my invention, the same being shown in connection with an ordinary hub and spindle. Fig. 2 is a detail in plan of one of the roller-sections. Fig. 3 is a transverse section of the same. Fig. 4 is a transverse section of Fig. 1. Fig. 5 is a detail of the outer tubular sleeve. Fig. 6 is a detail in elevation of the outer flanged spindle-nut.

Like numerals of reference indicate like parts in all the figures of the drawings.

For the purpose of illustration I have shown my improved bearing in connection with an ordinary axle and iron hub, such as is employed in ordinary portable machinery for farm use, &c.; but it will be understood that, as before stated, the invention is equally applicable to all kinds of machinery, shafting, railway-coaches, &c., and is therefore not limited to the use shown.

1 designates an ordinary iron axle, at the outer end of which is located the reduced spindle 2, which may be either tapered or cylindrical, as shown. At the inner end of the spindle is formed the fixed collar 3, and at the outer end of the spindle is the threaded portion 4, all of the usual formation.

Slipped over and tightly fitting the spindle 2 is the inner tubular fixed sleeve 5, said sleeve having formed at its inner end the annular flange 6, designed to abut against the collar 3 of the spindle and terminating at its outer end opposite the threaded portion of said spindle.

Arranged about the inner tubular fixed sleeve 5 is a series of loose roller-sections 7, (see particularly detail views Figs. 2 and 3,) each of which consists of a pair of longitudinally-opposite segmentally-curved heads 8, formed upon the arc of a circle slightly greater than that of the inner fixed tubular sleeve 5 and connected at their middles by an intermediate longitudinally-disposed bar 9. In the opposing faces of these heads are loosely journaled the axial trunnions of a pair of antifriction-rollers 10, the diameters of which slightly exceed the thickness of the said segmental heads 8, so that the latter are out of contact with the surface of the inner fixed tubular sleeve 5. Any number of these roller-sections may be employed, and the same may be varied in their construction, if desired. Four of them in the present instance constitute a set, and the same are assembled about the sleeve 5, as shown. These roller-sections are of such length as to terminate short of the outer end of the sleeve 5, which latter at said end is threaded, as shown, for the reception of a nut 11 of preferably slightly greater diameter than the roller-sections 6 when assembled. It is between this nut and the flange 6 of the sleeve 5 that the roller-sections are loosely confined—loosely, for the reason that the nut 11 does not bind thereagainst—so that not only are the rollers of each section free to revolve in their frames, but the entire sections are likewise free to revolve about the sleeve 5, and this, too, in the same manner as if the rollers were all journaled in one cylindrical common frame.

Loosely surrounding the assembled roller-sections, between yet out of contact with the nut 11 and flange 6 of the inner sleeve 5, is the outer tubular revoluble sleeve 12, the same terminating at its outer end about flush with the roller-sections, and being externally threaded thereat. An angular flange 13 is formed at the inner end of the sleeve 12, the same taking over the flange 6 of the inner sleeve and the fixed collar 3 of the spindle and countersunk in the inner end of the hub 14, which latter is bored out to tightly and immovably fit upon the sleeve 12, beyond which sleeve the front end of the hub extends.

Located on the outer end of the outer movable sleeve 12 is a binding-nut 15, the same serving to clamp the hub between it and the angular flange 13 of the sleeve 12.

16 designates a spindle-nut, the same being threaded on the outer end of the spindle 2 beyond the nut 11 and provided on its inner face with an annular flange 17, which is out of contact with yet loosely encircles the nut 11 by reason of the fact that it abuts against the outer projecting end of the fixed sleeve 5, which, as shown, is slightly beyond the nut 11, and also, by reason thereof, the face of the flange 17 is maintained out of contact with the outer face of the nut 15, which latter it will be apparent revolves with the hub and the sleeve 12, upon which it is mounted.

From the foregoing description, in connection with the accompanying drawings, it will be obvious that I have produced a roller-bearing of cheap and simple construction, whose parts are few, easily manufactured and assembled, and which will perform its office of reducing friction between moving parts in a highly efficient manner; also, that by removing the two nuts 11 and 16 access can be directly had to the interior of the bearing for cleansing and repair purposes.

Although I have shown the invention applied to the metal wheel of an agricultural machine, yet it will be apparent that I do not limit my invention to such application, but hold that the invention may be as advantageously used in connection with vehicles of any kind—pulleys and shafting and farm and other portable machinery in general.

Having described my invention, what I claim is—

1. The combination with a shaft or axle, a sleeve secured immovably thereon, one end thereof being provided with a flange and the opposite end threaded, and a nut located on said latter end, of a series of antifriction-rollers arranged about the sleeve between the flange and nut and substantially agreeing in length with the distance between the same, an external sleeve shorter than the first and of a substantially uniform bore throughout its length loosely surrounding the antifriction-rollers between said nut and flange, a hub mounted rigidly on the external sleeve and abutting against the flanged end of the same, and a nut located on the outer end of the external sleeve and binding the hub against the flange and overlapped and retained by the nut of the inner sleeve, substantially as specified.

2. The combination with the shaft or axle, the sleeve rigidly mounted thereon and terminating at one end in an annular flange and having the opposite end threaded and a nut thereon, of a series of segmentally-curved roller-carrying frames located and free to revolve between the nut and flange and around the sleeve, said frames substantially agreeing in length with the distance between the nut and flange, an outer sleeve shorter than the first and overlapped by said nut, and a hub mounted rigidly thereon, substantially as specified.

3. The combination with the axle terminating in the spindle provided with the fixed collar and the outer threaded end, the sleeve rigidly mounted on the spindle and terminating and threaded in rear of the end of the spindle, and a nut on the outer end of the sleeve, of antifriction-rollers located between the nut and collar of the axle and adapted to revolve around the sleeve, an external sleeve surrounding the rollers and of less length than the inner sleeve, of uniform bore and adapted to revolve between the nut and collar and confined by the nut, said outer sleeve being shorter than the first sleeve and provided at its outer end with threads and at its inner end with a collar-inclosing flange, a nut on the outer end of the outer sleeve, a hub clamped between the same and the flange of the outer sleeve, and a nut on the end of the spindle, substantially as specified.

4. The combination with the axle having the collar 3 and the outer threaded end, an inner sleeve shorter than the spindle and having an outer threaded end and an inner flanged end, and the series of frames having heads 8 and connecting-bars 9, and the rollers 10 journaled in the heads, of the outer sleeve surrounding the rollers and loosely confined between the flange and nut, said outer sleeve being shorter than the first and having its outer end threaded and its inner end provided with the collar-inclosing flange 13, the hub located on the outer sleeve, the nut on the latter and clamping the hub against the flange 13, and the socket-nut 16 threaded on the outer end of the spindle and surrounding the nut of the inner sleeve, substantially as specified.

In testimony whereof I affix my signature in presence of two witnesses.

GOODLOE C. TWYMAN.

Witnesses:
C. J. BLOODWORTH,
S. J. BRADFORD.